(12) United States Patent
Harrison, III et al.

(10) Patent No.: US 9,108,497 B2
(45) Date of Patent: Aug. 18, 2015

(54) STRUCTURAL ENCLOSURE FOR PACKAGING POWER ELECTRONICS FOR VEHICLE BATTERY MODULES AND METHODS OF SERVICING AND MANUFACTURING VEHICLES USING SAME

(76) Inventors: Albert W. Harrison, III, Detroit, MI (US); Dave Mleczko, Rochester Hills, MI (US); Scott Sabin, New Hudson, MI (US)

( * ) Notice: Subject to any disclaimer, the term of this patent is extended or adjusted under 35 U.S.C. 154(b) by 788 days.

(21) Appl. No.: 13/158,956

(22) Filed: Jun. 13, 2011

(65) Prior Publication Data

US 2012/0312612 A1 Dec. 13, 2012

(51) Int. Cl.
*B60R 16/04* (2006.01)
*B60K 1/04* (2006.01)
*H01M 2/10* (2006.01)
*H01M 10/42* (2006.01)

(52) U.S. Cl.
CPC .............. *B60K 1/04* (2013.01); *H01M 2/1077* (2013.01); *H01M 10/425* (2013.01); *B60K 2001/0438* (2013.01); *B60K 2001/0472* (2013.01); *B60Y 2400/61* (2013.01); *H01M 2220/20* (2013.01); *Y10T 29/49622* (2015.01); *Y10T 29/49815* (2015.01)

(58) Field of Classification Search
USPC ..................... 180/65.1, 65.31, 68.5; 414/462
See application file for complete search history.

(56) References Cited

U.S. PATENT DOCUMENTS

| | | | | |
|---|---|---|---|---|
| 4,124,086 A * | 11/1978 | Janotik | ........................ | 180/65.1 |
| 4,216,839 A * | 8/1980 | Gould et al. | ................. | 180/65.1 |
| 4,374,187 A * | 2/1983 | Sano | ............................. | 429/175 |
| 5,040,627 A * | 8/1991 | Swayze | ........................ | 180/68.5 |
| 5,150,762 A * | 9/1992 | Stegeman et al. | ............. | 180/208 |
| 5,378,555 A * | 1/1995 | Waters et al. | ................... | 429/97 |
| 5,437,939 A * | 8/1995 | Beckley | ........................ | 429/99 |
| 5,441,123 A * | 8/1995 | Beckley | ........................ | 180/68.5 |
| 5,501,289 A * | 3/1996 | Nishikawa et al. | ........... | 180/68.5 |
| 5,558,949 A * | 9/1996 | Iwatsuki et al. | ................ | 429/99 |
| 5,577,747 A * | 11/1996 | Ogawa et al. | ................. | 180/220 |
| 5,639,571 A * | 6/1997 | Waters et al. | ................... | 429/71 |
| 5,934,694 A * | 8/1999 | Schugt et al. | ............ | 280/33.991 |
| 6,188,574 B1 * | 2/2001 | Anazawa | ........................ | 361/695 |
| 6,624,610 B1 * | 9/2003 | Ono et al. | ..................... | 320/104 |
| 7,279,246 B2 * | 10/2007 | Kelly et al. | .................... | 429/425 |
| 8,397,853 B2 * | 3/2013 | Stefani et al. | ................. | 180/68.5 |
| 2004/0134699 A1 * | 7/2004 | Shimizu | ........................ | 180/68.5 |
| 2005/0218136 A1 * | 10/2005 | Kotani et al. | ................. | 219/202 |
| 2009/0152034 A1 * | 6/2009 | Takasaki et al. | ............. | 180/68.5 |
| 2009/0317695 A1 * | 12/2009 | Wood et al. | ..................... | 429/53 |
| 2010/0000816 A1 * | 1/2010 | Okada | ........................... | 180/68.5 |
| 2010/0175940 A1 * | 7/2010 | Taneda et al. | ................. | 180/68.5 |
| 2012/0018238 A1 * | 1/2012 | Mizoguchi et al. | ........... | 180/68.5 |
| 2012/0055725 A1 * | 3/2012 | Mizoguchi et al. | ........... | 180/68.5 |
| 2012/0103716 A1 * | 5/2012 | Fujihara et al. | ............... | 180/220 |

* cited by examiner

*Primary Examiner* — J. Allen Shriver, II
*Assistant Examiner* — Bridget Avery (57) ABSTRACT

An apparatus for a vehicle is provided that includes a structural enclosure configured to attach to both first and second spaced battery module housings while spanning the gap between the spaced battery module housings. The structural enclosure is configured to support power electronics and is configured to allow connection of the power electronics to the battery modules through the structural enclosure. A method of servicing vehicles and a method of manufacturing vehicles is also provided.

8 Claims, 13 Drawing Sheets

STRUCTURAL ENCLOSURE FOR PACKAGING POWER ELECTRONICS FOR VEHICLE BATTERY MODULES AND METHODS OF SERVICING AND MANUFACTURING VEHICLES USING SAME

TECHNICAL FIELD

The invention relates to an apparatus with a structural enclosure for packaging power electronics in a vehicle having spaced battery modules, and for methods of servicing and manufacturing vehicles using the structural enclosure.

BACKGROUND

Saddle-bag batteries are characterized by an arrangement in which two large battery modules are situated about the centerline of the vehicle adjacent to the longitudinal drive shaft which provides motive power to the rear wheels. This type of arrangement is used in rear-wheel drive and all-wheel drive vehicles to maximize battery size given the architecture of such vehicles. In such an arrangement, the battery modules are typically separated into separate enclosures which complicates high voltage and control system wiring from one battery module to the other. Separate power electronics for each battery module are housed in the separate enclosures. Packaging of the power electronics is challenging, given the cramped conditions which exist within each battery module. This arrangement also presents difficulties associated with gaining access to and connecting the high voltage and control cables needed to link the battery modules to the vehicle transmission.

SUMMARY

An apparatus is provided that solves a number of problems associated with providing power electronics functionality to vehicles employing spaced battery modules (e.g., laterally-spaced saddle-bag batteries). An apparatus is provided for a vehicle that has a first battery module in a first battery module housing and a second battery module in a second battery module housing. The battery housings of the vehicle are spaced from one another to define a gap therebetween. The battery modules are controllable and powerable by power electronics. The apparatus may be referred to as a structural power supply module and includes a structural enclosure configured to attach to both the first battery module housing and the second battery module housing while spanning the gap between the battery module housings when in an installed position. The enclosure is configured to support the power electronics and is configured to allow connection of the power electronics to the battery modules through the structural enclosure. The enclosure permits some of the power electronics to be supported on external surfaces so that they are easily accessible for connection to other vehicle components, such as an electric motor and/or for servicing or power shutoff. The enclosure also supports electronic components within an internal cavity of the enclosure, and has openings that allow the internal electronic components to be operatively connected to the battery modules through the structural enclosure.

The structural enclosure may have a lid that is openable to allow easy access to the internal power electronics and seals to provide a leak-free and dust-free environment for the internal power electronics. The apparatus is configured to utilize available packaging space in a vehicle to allow the power electronics to be easily accessible, and may be especially useful for battery modules arranged in a "saddle-bag" manner. Because the structural enclosure is "structural", i.e., it is substantially rigid and defines a cavity of fixed volume for packaging the power electronics in a fixed arrangement with respect to one another and with respect to the battery modules, it supports straight-forward wiring of power supply and control systems from one battery module to the other battery module, and eliminates the need for a cumbersome, nonstructural tubular connection.

The apparatus described is a fully-integrated modular unit that enables an efficient and cost effective method of servicing vehicles. A method of servicing a vehicle, and specifically, a method of servicing a battery assembly on the vehicle is provided. The battery assembly includes first and second battery modules, a first battery module housing substantially enclosing the first battery module, a second battery module housing substantially enclosing the second battery module and spaced from the first battery module housing to define a gap therebetween. The battery assembly also includes the structural enclosure described above. The method includes removing a battery assembly from the vehicle. A lid of the structural enclosure is opened, and wiring connecting power electronics in the structural enclosure to the first battery module and additional wiring connecting the power electronics in the structural enclosure to the second battery module is disconnected. The structural enclosure is then detached from from the battery modules. The structural enclosure with attached power electronics may then be serviced without opening or otherwise accessing or disturbing the battery supply modules.

A method of manufacturing vehicles includes mounting a first structural enclosure of an inventory of substantially identical structural enclosures to spaced battery module housings on a first vehicle to span between the battery module housings of the first vehicle. Power electronics mounted to the first structural enclosure are then operatively connected to battery modules within the battery module housings of the first vehicle. A second structural enclosure of the inventory of substantially identical structural enclosures is then mounted to spaced battery module housings on a second vehicle to span between the battery module housings of the second vehicle. Power electronics mounted to the second structural enclosure are then operatively connected to battery modules within the battery module housings of the second vehicle. The battery modules of the first vehicle are a different size than the battery modules of the second vehicle. The method demonstrates that, because the structural enclosure of the structural power supply module is not limited to use with a particular length or width of battery modules, the same structural enclosure design may be used for multiple applications, such as on different vehicle platforms.

The above features and advantages and other features and advantages of the present invention are readily apparent from the following detailed description of the best modes for carrying out the invention when taken in connection with the accompanying drawings.

DETAILED DESCRIPTION

Figure 1:
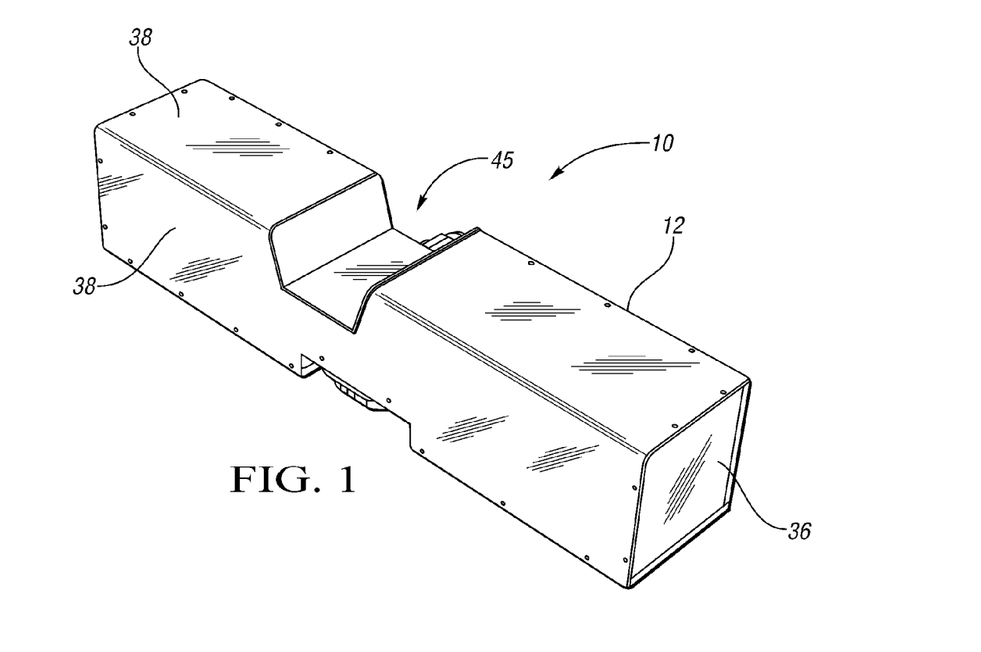
FIG. 1 is a schematic perspective illustration of an apparatus for a vehicle including a structural enclosure formed by walls and a lid and supporting power electronics.
Figure 6:
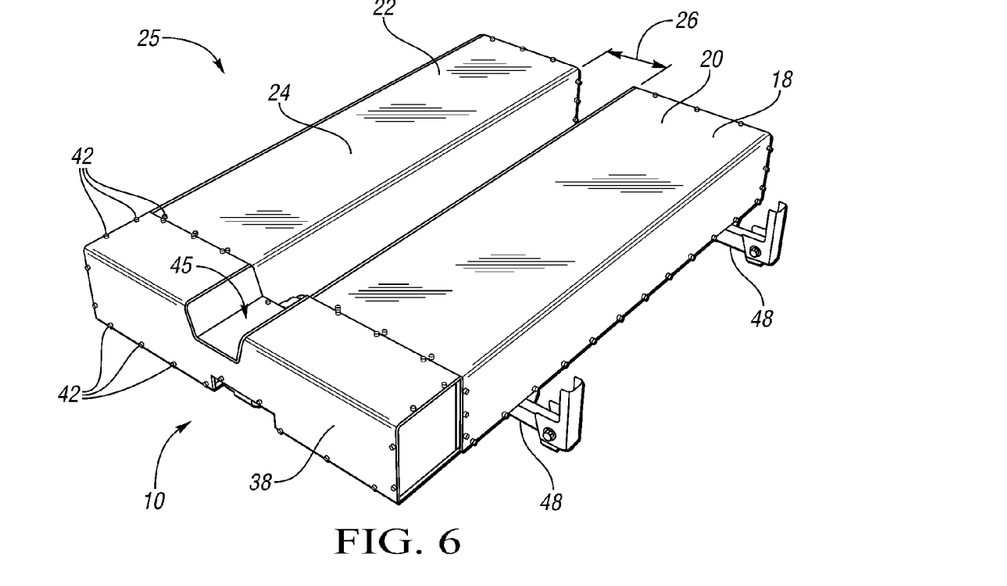
FIG. 6 is a schematic perspective illustration of a battery assembly including the battery module housings and the structural enclosure and showing the battery module support structure.
Figure 10:
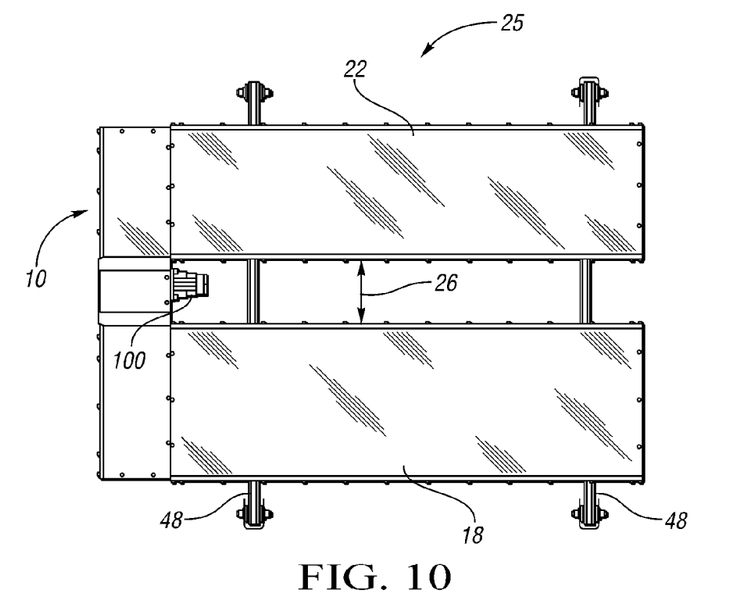
FIG. 10 is a schematic top view illustration of the battery assembly of FIG. 6 showing the electrical connector attached to the structural enclosure.

Referring to the drawings, wherein like reference numbers refer to like components throughout the several views, FIG. 1 shows an apparatus that may be referred to as a structural power supply module 10. As further described herein, the structural power supply module 10 includes a structural enclosure 12 that supports power electronics needed to support the function of a first battery module 14 and a second battery module 16, shown in FIG. 7. As used herein, a "structural" enclosure is substantially rigid and defines a cavity of fixed volume, and includes a metal or composite enclosure. The battery modules 14, 16 each include multiple battery units 17 (shown in FIG. 7) operatively connected to one another to provide a predetermined amount of stored electrical energy for a given application, such as for use in powering a hybrid or electric vehicle. The battery module 14 is contained in a battery module housing 18 that includes a battery unit support portion 19 shown in FIG. 7 and a removable lid 20, shown in FIG. 6. The battery module 16 is contained in a battery module housing 22 that includes a battery unit support portion 23 shown in FIG. 7 and a removable lid 24, shown in FIG. 6. The battery module housings 18, 22 are laterally-spaced from one another to define a gap 26 therebetween. As best shown in FIG. 10, the structural power supply module 10 is configured to span the gap 26 and attach to both battery module housings 18, 22 in an installed position. When the structural power supply module 10 is attached to the battery module housings 18, 22, the structural power supply module 10, power electronics (including internal power electronics 50, 52, 54, 56, electrical connectors 100, 102, and power shutoff 104, discussed below), battery module housings 18, 22, and battery modules 14, 16 form a battery assembly 25.

Figure 2:
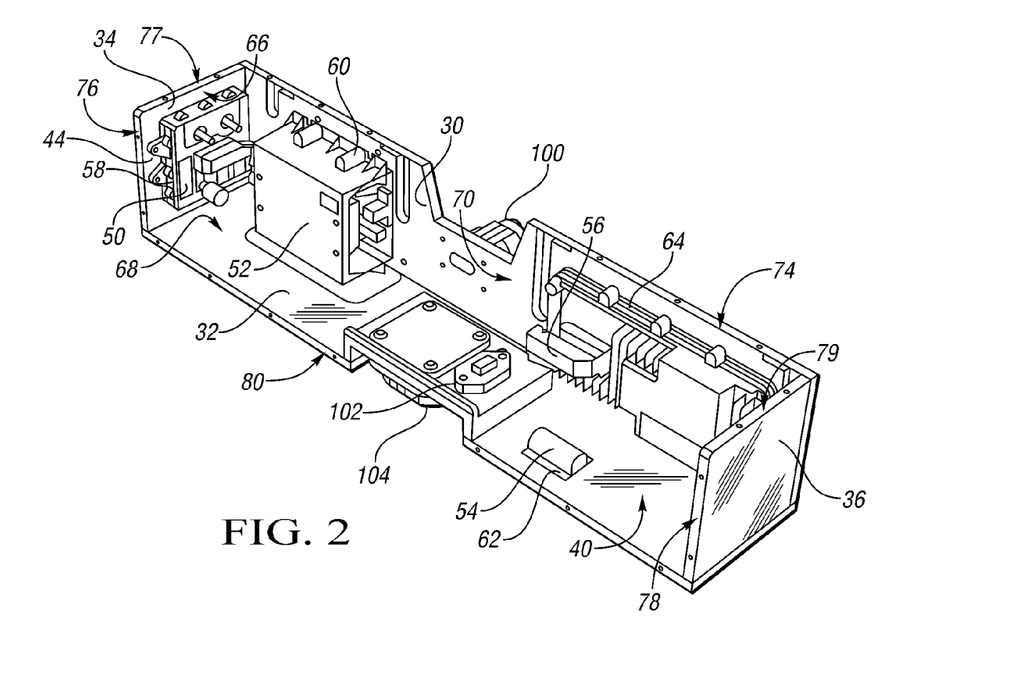
FIG. 2 is a schematic perspective illustration of the structural enclosure of FIG. 1 with the lid removed to show internal power electronics housed in an internal cavity of the structural enclosure.

FIGS. 1 and 2 show that the structural enclosure 12 includes multiple walls, also referred to as panels 30, 32, 34, 36, forming multiple sides, as well as a lid 38 configured to form two sides. The lid 38 is in a closed position in FIG. 1 in which it further defines and encloses an internal cavity 40 shown in FIG. 2, in which the lid 38 is removed (i.e., in an open position). In the embodiment shown, the lid 38 is attached to the multiple panels 30, 32, 34, 36 with fasteners 42 (shown in FIG. 6) and is moved from the closed and open positions by removing the fasteners 42. In other embodiments, the lid 38 may be hinged to the one of the panels 30, 32, 34, 36 such that it is pivotable between an open position and a closed position. The panels 30, 32, 34, 36 define an opening 44 that is closed by the lid 38 in FIG. 1. In still other embodiments, the structural enclosure could be only a single panel, like the bottom panel 32, and the lid could be five-sided (including sides corresponding to the side panels 34, 36, the rear panel 30 and the two-sided lid 38). In any of the embodiments, two more of the panels could be integrally formed.

Figure 3:
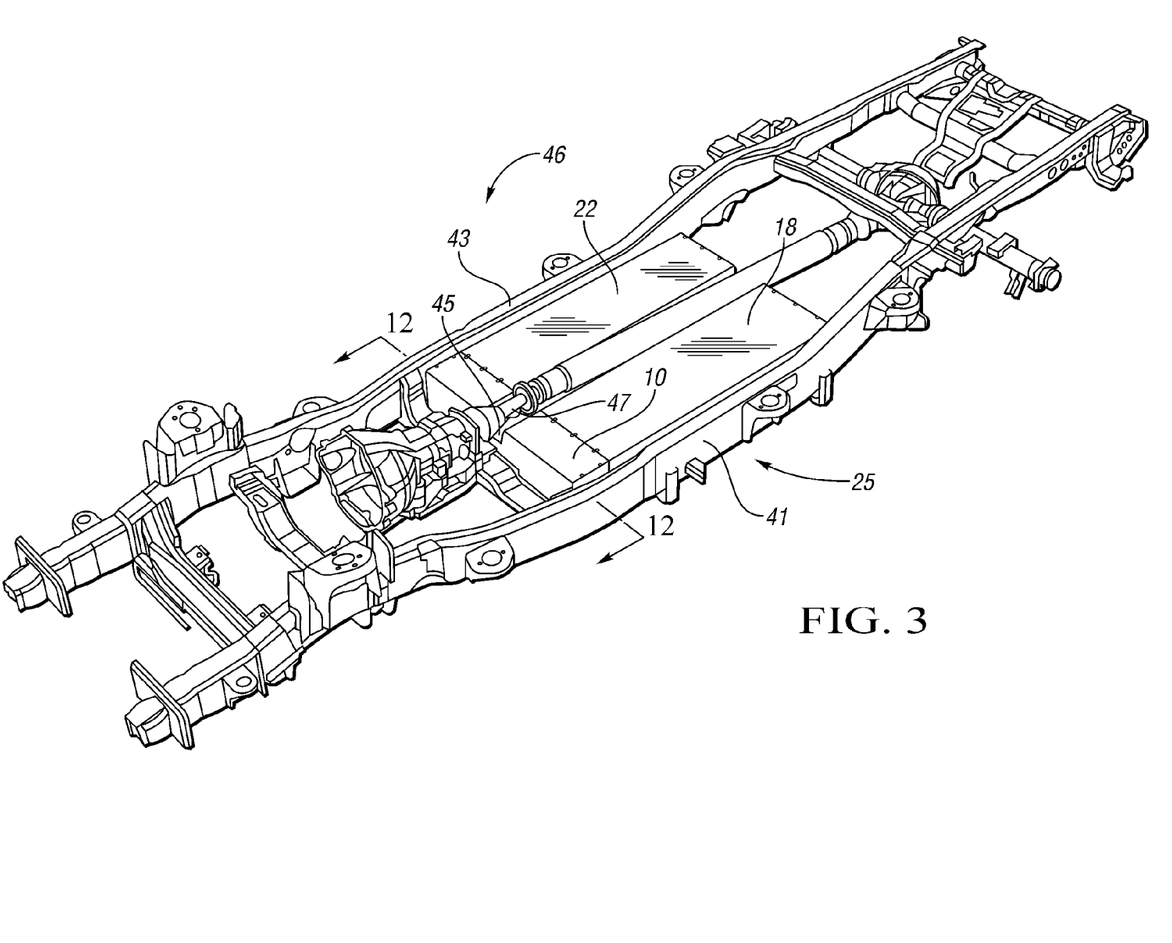
FIG. 3 is a schematic perspective illustration of a vehicle with a frame, a drivetrain, showing the structural enclosure attached to laterally-spaced battery housings, and attached to longitudinal frame rails.
Figure 18:
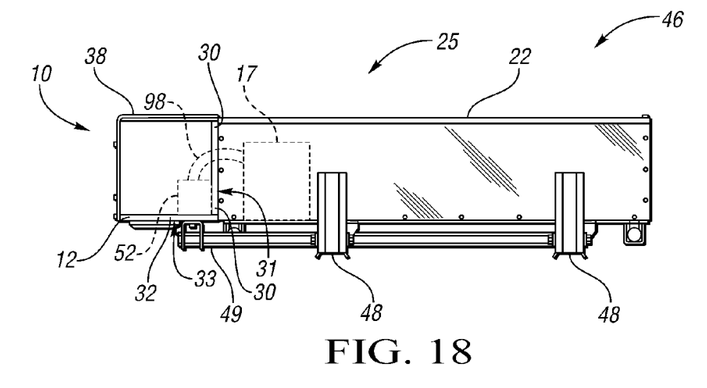
FIG. 18 is a schematic perspective illustration of the apparatus of FIG. 1 attached to battery module housings of a first vehicle.

In the embodiment shown, when the structural power supply module 10 is in the installed position on a vehicle 46 as in FIG. 3, panel 30 is a rear panel, panel 32 is a bottom panel, and panels 34 and 36 are side panels. In the installed position, rear panel 30 is attached to the battery module housings 18, 22 with its rear surface 31 facing the battery module housings 18, 22 as shown in FIG. 18. The rear panel 30 has a plurality of openings 37, shown in FIG. 13, through which fasteners extend to connect the structural power supply module 10 to the battery module housings 18, 22. One such fastener 39 is visible in FIG. 7. The bottom panel 32 is attached to battery module support structure, including transverse support rails 48 and longitudinal support rails 49, with its bottom surface 33 facing the support rails 48, 49, as shown in FIGS. 8 and 18. In the embodiment shown, the structural power supply module 10 is of a sufficient width such that it extends between longitudinally-extending frame rails 41, 43 of the vehicle 46 of FIG. 3. The side panels 34, 36 of the structural enclosure 12 could be provided with fastener openings so the structural power supply module 10 could also be directly mounted to and supported by the frame rails 41, 43 with fasteners extending through the frame rails 41, 43.

Figure 4:
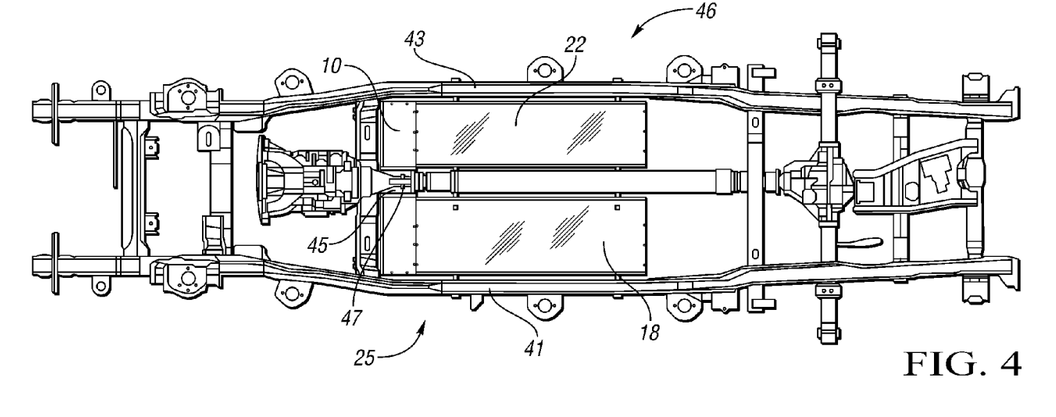
FIG. 4 is a schematic top view illustration of the vehicle of FIG. 4.

FIGS. 1, 2 and 4 show that the panel 30 and lid 38 are configured so that the enclosure 12 and lid 38 define a notch 45. This allows the enclosure 12 to be packaged around a longitudinally-extending vehicle component, maximizing the use of available packaging space. When the structural enclosure 12 is in the installed position of FIG. 3, a longitudinally-extending component is a portion of a transmission driveshaft 47. In other embodiments, a different longitudinally-extending component, such as a vehicle exhaust pipe, may be partially surrounded by the structural enclosure 12 at the notch 45.

Figure 7:
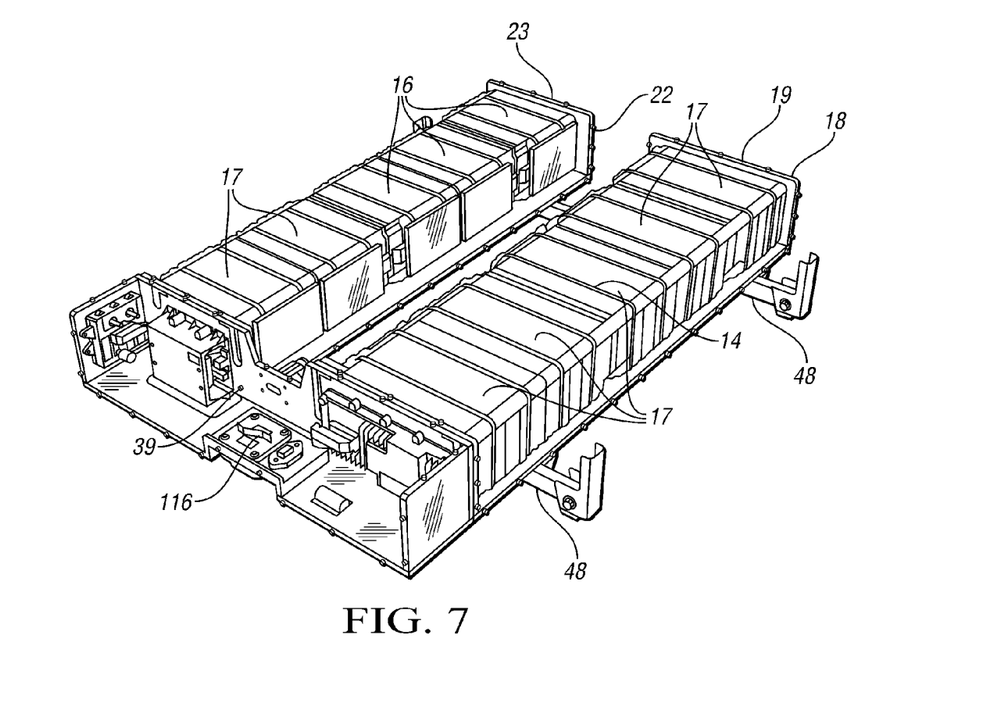
FIG. 7 is a schematic perspective illustration of the battery assembly of FIG. 6 with the lid of the structural enclosure and lids of the battery module housings removed to show battery modules therein.
Figure 8:
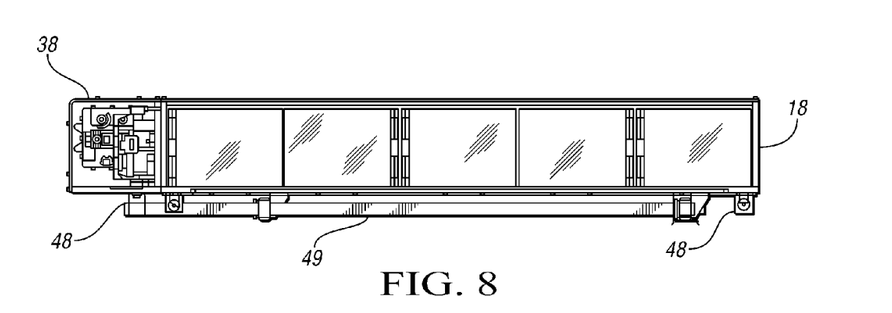
FIG. 8 is a schematic side view illustration of the battery assembly of FIG. 7 with a side wall of the structural enclosure removed.
Figure 13:
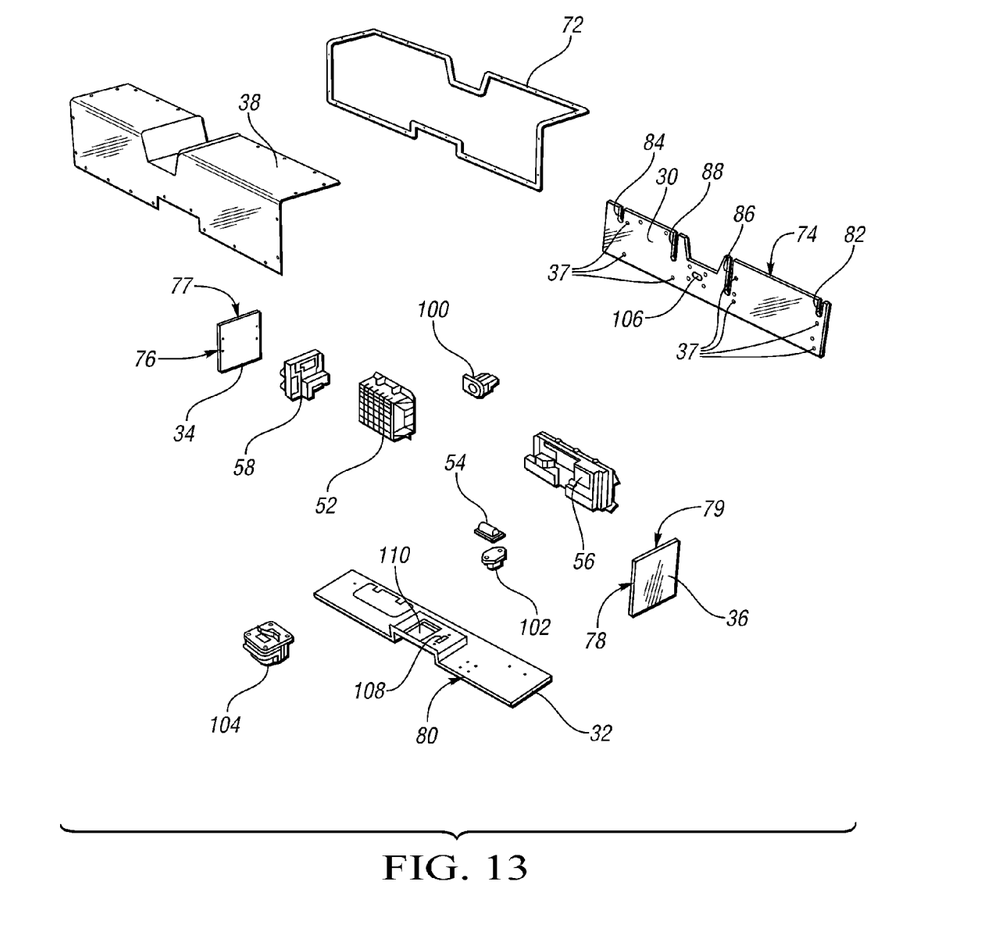
FIG. 13 is a schematic perspective illustration in exploded view of the apparatus of FIG. 1 showing power electronics and a sealing gasket.

FIG. 2 shows power electronics operable to control and provide power flow to and/or from the battery modules 14, 16 of FIG. 7. The power electronics include internal power electronics 50, 52, 54, 56 that are secured to the structural enclosure 12 with mechanical attachments such as brackets 58, 60, 62, 64 so that the internal power electronics 50, 52, 54, 56 are supported at internal surfaces 66, 68, 70 of the structural enclosure 12. When the lid 38 is in the closed position of FIG. 1, the internal power electronics 50, 52, 54, 56 are enclosed within the internal cavity 40. FIG. 13 shows a gasket 72 that serves as a sealing mechanism at an interface between the panels 30, 32, 34, 36 and the lid 38 to provide a leak-free and dust-free environment for the internal power electronics 50, 52, 54, 56 when the lid 38 is in the closed position. The interface includes surfaces 74, 76, 77, 78, 79, 80 shown in FIG. 2 at the edges or perimeter of the panels 30, 32, 34, 36. In lieu of or in addition to the gasket 72, mechanical seals or dispensable sealant may be used to seal the enclosure 12.

Figure 15:
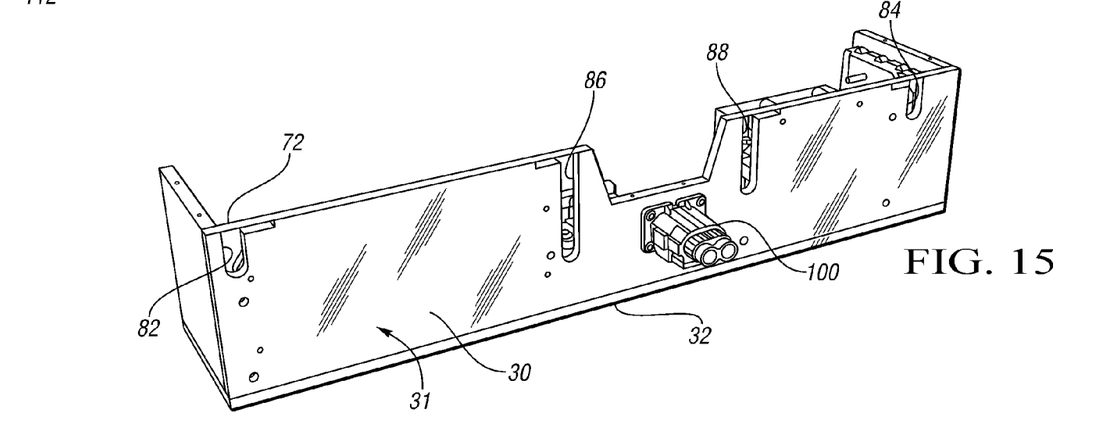
FIG. 15 is a schematic perspective illustration of the structural enclosure of FIG. 14 showing an electrical connector.
Figure 16:
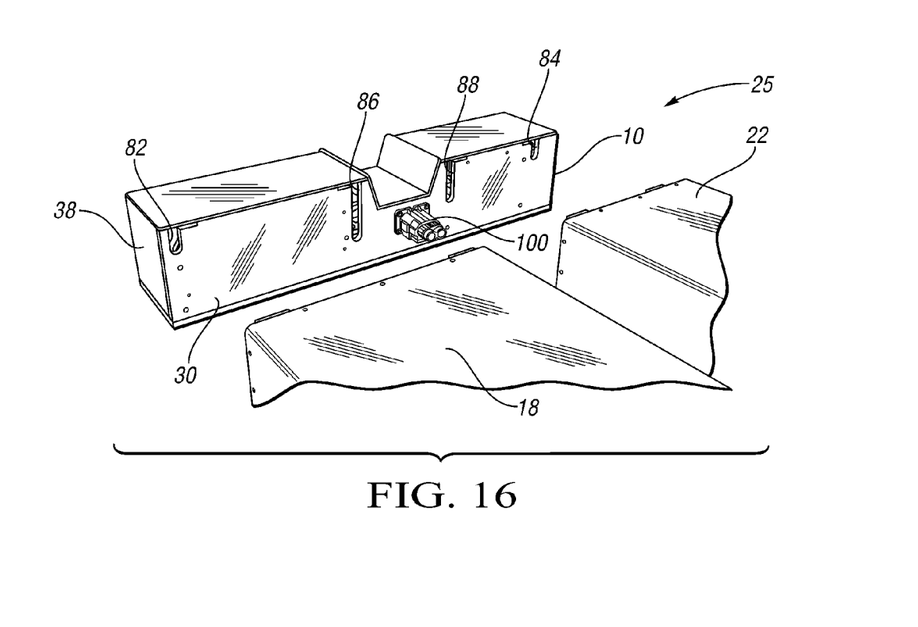
FIG. 16 is a schematic perspective illustration of the battery assembly of FIG. 6 in partial exploded and fragmentary view showing the electrical connector.
Figure 17:
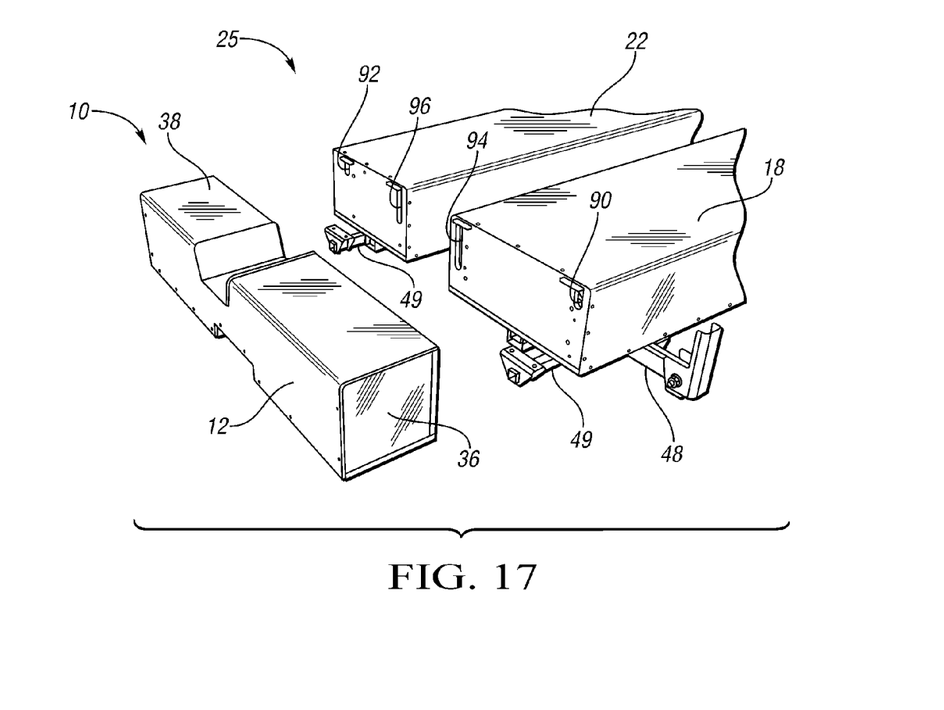
FIG. 17 is a schematic perspective illustration of the battery assembly of FIG. 6 in partial exploded and fragmentary view showing the battery module support structure.

As best shown in FIGS. 13, 15 and 16, the rear panel 30 has first and second laterally-spaced openings 82, 84, 86, 88 formed as notches extending from an upper edge of the rear panel 30. The openings 82, 84, 86, 88 align with similar openings 90, 92, 94, 96 shown in FIG. 17 in the first and second battery module housings 18, 22 when the structural power supply module 10 is secured to the battery module housings 18, 22. The aligned openings 82, 84, 86, 88 and 90, 92, 94, 96 form connection paths to allow high voltage and control system wiring to extend from the battery modules 14, 16 to the internal power electronics, as shown in phantom in FIG. 18 in which wiring cable 98 extends through the rear panel 30 to operatively connect the internal power electronic component 52 to battery unit 17. The openings 82, 84, 86, 88 and 90, 92, 94, 96 are covered when the lid 38 is in the closed position and structural power supply module 10 is secured to the battery module housings 18, 22 to create leak-free connection paths. The connection paths may alternatively be accomplished through holes and grommets in the rear panel 30.

Figure 9:
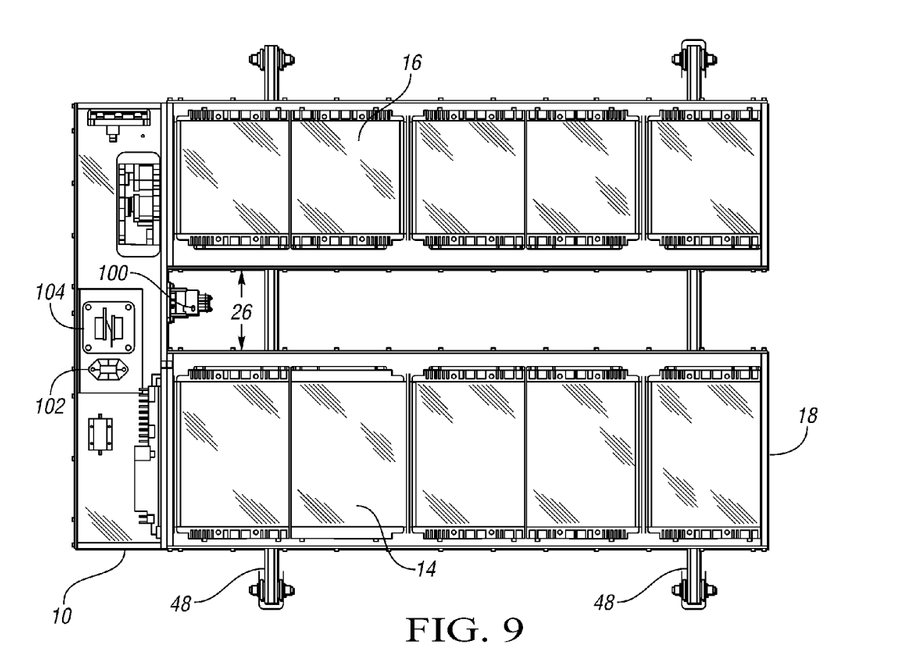
FIG. 9 is a schematic top view illustration of the battery assembly of FIG. 8.
Figure 14:
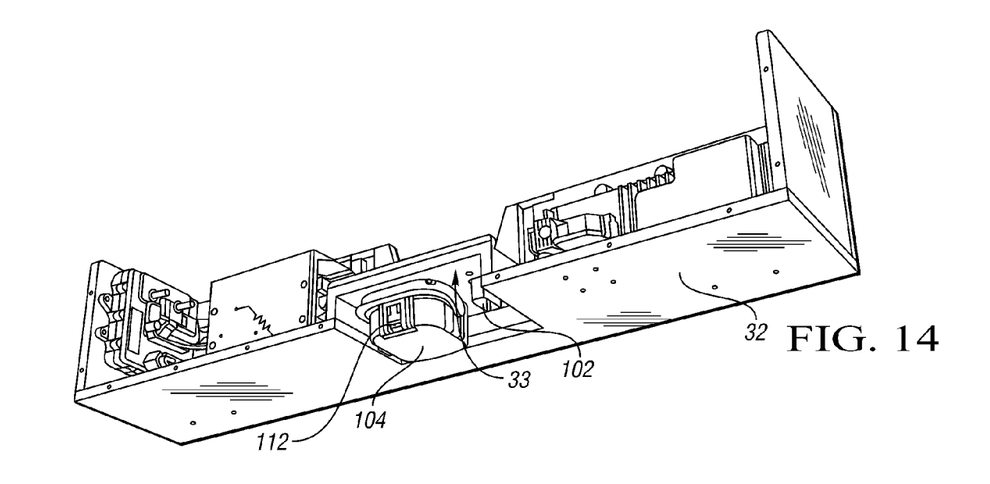
FIG. 14 is a schematic perspective illustration of the structural enclosure of FIG. 2 with the lid removed showing power electronics.

Referring to FIGS. 2, 14, and 15, the power electronics supported by the structural power supply module 10 include electrical connectors 100, 102 and a power shutoff mechanism 104. The electrical connector 100 is supported by the panel 30 at an external rear surface 31 of the rear panel 30 using mechanical attachments and fasteners. The rear panel 30 has an opening 106, best shown in FIG. 13, through which the electrical connector 100 extends when mounted at the rear surface 31. The packaging of the electrical connector 100 at the rear surface 31 is in a central location utilizing available packaging space between the battery module housings 18, 22, which allows the electrical connector 100 to be accessible between the battery modules housings 18, 22 as shown in FIGS. 9 and 10. This permits easy access for connector cables between the electrical connector 100 and a motor/generator or other component of a vehicle transmission to provide power between the internal electrical components 50, 52, 54, 56 in the internal cavity 40 and/or battery modules 14, 16 with additional power wiring between the battery modules 14, 16 and the connector 100 extending in the cavity 40.

Similarly, electrical connector 102 is supported at the bottom surface 33 of the bottom panel 32 using mechanical attachments and fasteners, as shown in FIG. 14. The bottom panel 32 has an opening 108, best shown in FIG. 13, through which the electrical connector 102 extends when mounted at the bottom surface 33. The packaging of the electrical connector 102 at the bottom surface 33 in a central location allows the electrical connector 102 to be accessible between the battery modules housings 18, 22 as shown in FIG. 9. This permits easy access for connector cables between the electrical connector 102 and a motor/generator or other component of a vehicle transmission to provide power between the internal electrical components 50, 52, 54, 56 in the internal cavity 40 and/or battery modules 14, 16 with additional power wiring between the battery modules 14, 16 and the connector 102 extending in the cavity 40.

The power shutoff mechanism 104 is also supported by the bottom panel 32 at the external surface 33. The bottom panel 32 has an opening 110, best shown in FIG. 13, through which the power shutoff mechanism 104 extends when mounted at the bottom surface 33. The power shutoff mechanism 104 is operable from outside of the structural enclosure 10 through a port 112 shown in FIG. 14 to turn a switch 116 shown in FIG. 7. The power shutoff mechanism 104 and switch 116 are operatively connected by additional wiring that extends to at least some of the internal electrical components 50, 52, 54, 56 so that turning the switch will prevent power flow between the battery modules 14, 16 to another vehicle component such as an electric motor/generator through the power supply module 10. The structural enclosure 12 provides easy access to and servicing of the connectors 100, 102 and power shutoff mechanism 104.

Figure 5:
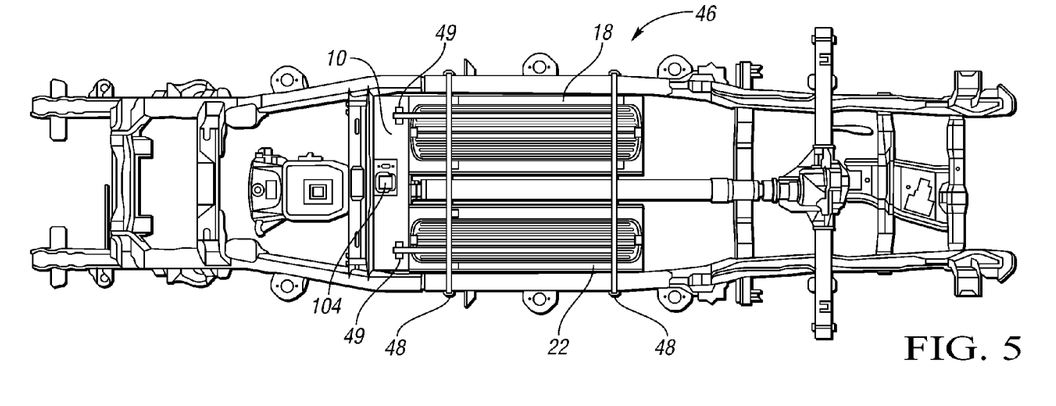
FIG. 5 is a schematic bottom view illustration of the vehicle of FIG. 4 showing battery module support structure supporting both the battery module housings and the structural enclosure.
Figure 21:
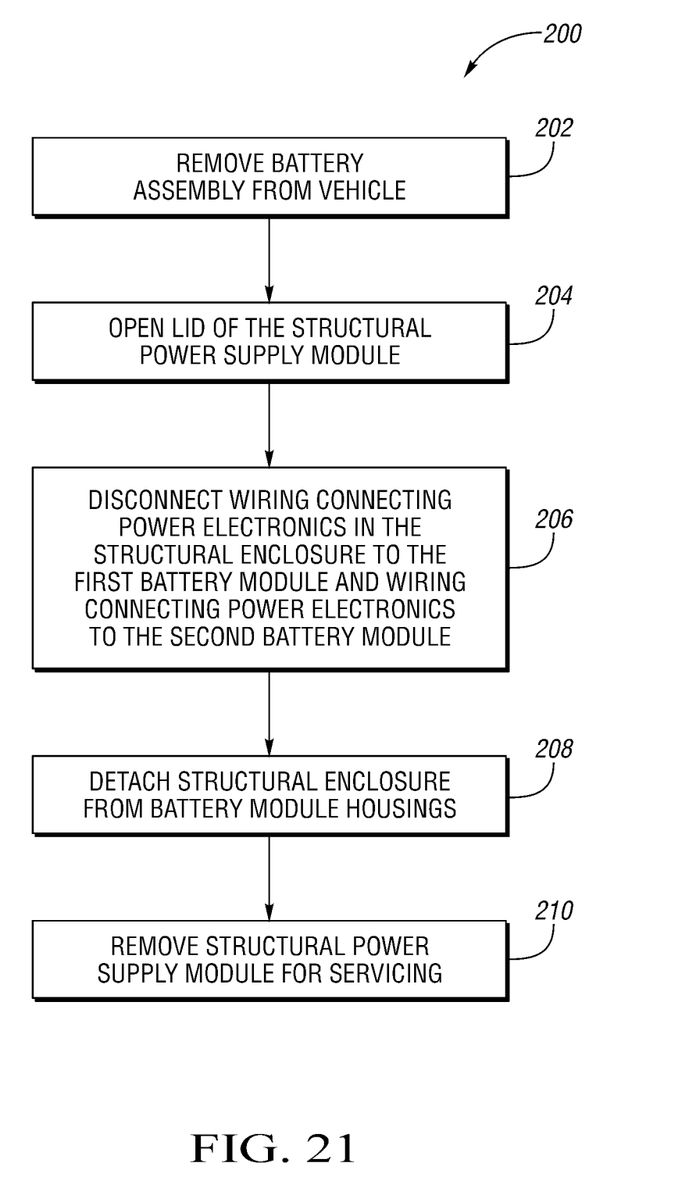
FIG. 21 is a flow diagram of a method of servicing a vehicle.

The modular nature of the structural power supply module 10 allows it to be removed for servicing or replacement without accessing or otherwise disturbing the battery modules 14, 16 within the battery module housings 18, 22. Referring to FIG. 21, a method 200 of servicing a vehicle is illustrated in a flow diagram. The method 200 is described with respect to the structural power supply module 10 in the battery assembly 25 on the vehicle 46 of FIG. 3. The method 200 begins with block 202, removing the battery assembly 25 from the vehicle. This is accomplished by disconnecting power supply connector cables connecting other vehicle components, such as an electric motor, with the electrical connectors 100, 102. Block 202 also requires detaching the battery assembly 25 from the transverse support rails 48 and longitudinal support rails 49 shown in FIG. 5.

Once the battery assembly 25 is removed from the vehicle 46, the lid 38 of the structural power supply module 10 is opened in block 204, as shown in the open position (off) in FIG. 2. In other embodiments, the lid may be hinged to the structural enclosure 12, and is opened by pivoting to an open position.

Next, in block 206, wiring operatively connecting any of power electronics 50, 52, 54, 56 in the structural enclosure 12 to the first battery module 14 and wiring operatively connecting any of the power electronics 50, 52, 54, 56 to the second battery module 16 is disconnected. This wiring is shown as wiring cable 98 in FIG. 18.

Figure 11:
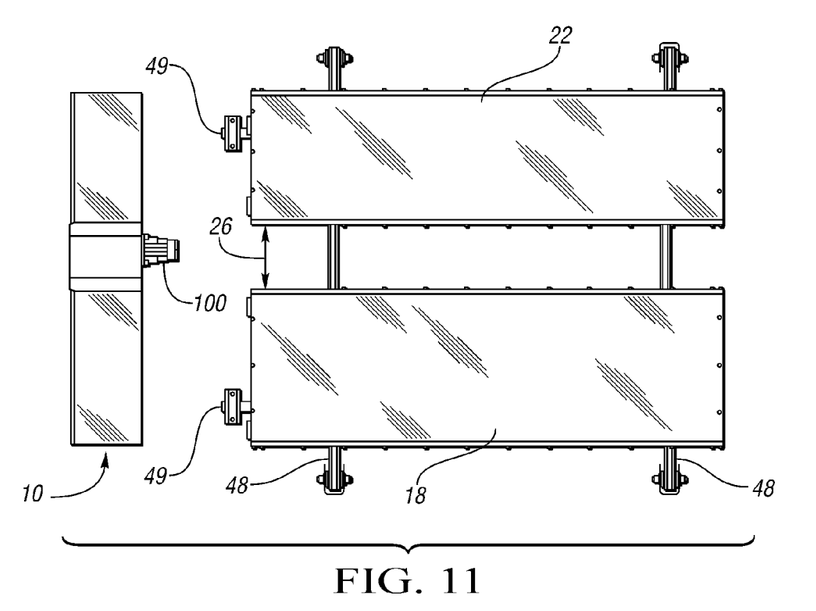
FIG. 11 is a schematic top view illustration of the battery assembly of FIG. 6 in partial exploded view.
Figure 12:
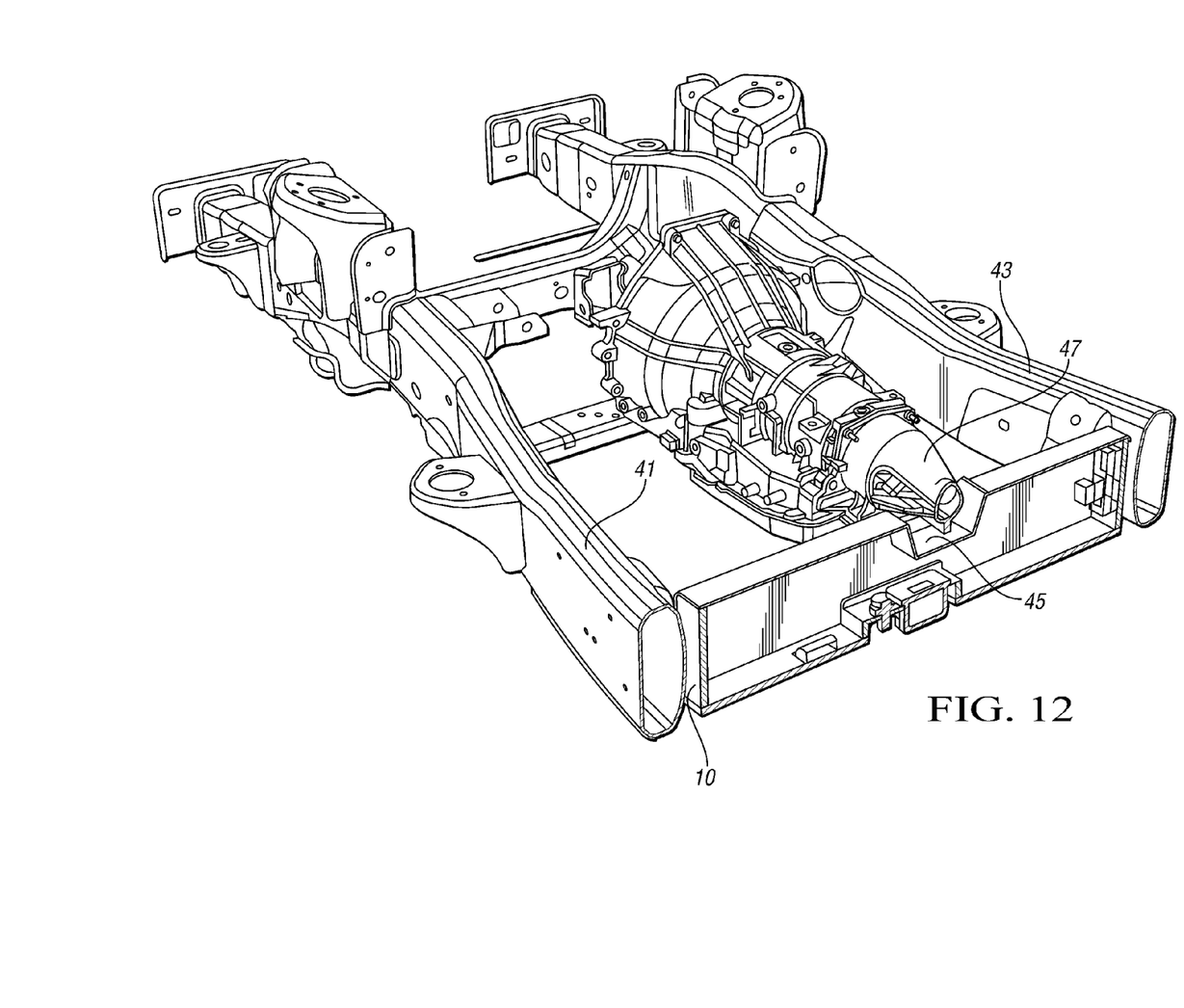
FIG. 12 is a schematic perspective cross-sectional illustration of the vehicle of FIG. 3 taken at lines 12-12 in FIG. 3.

In block 208, the structural enclosure 12 is detached from the battery module housings 18, 22 by removing the fasteners 39 (one shown in FIG. 7). The structural power supply module 10 is now completely separated from both the vehicle 46 and the battery supply modules 14, 16, as shown in FIG. 11, and can be removed for servicing in block 210.

Figure 22:
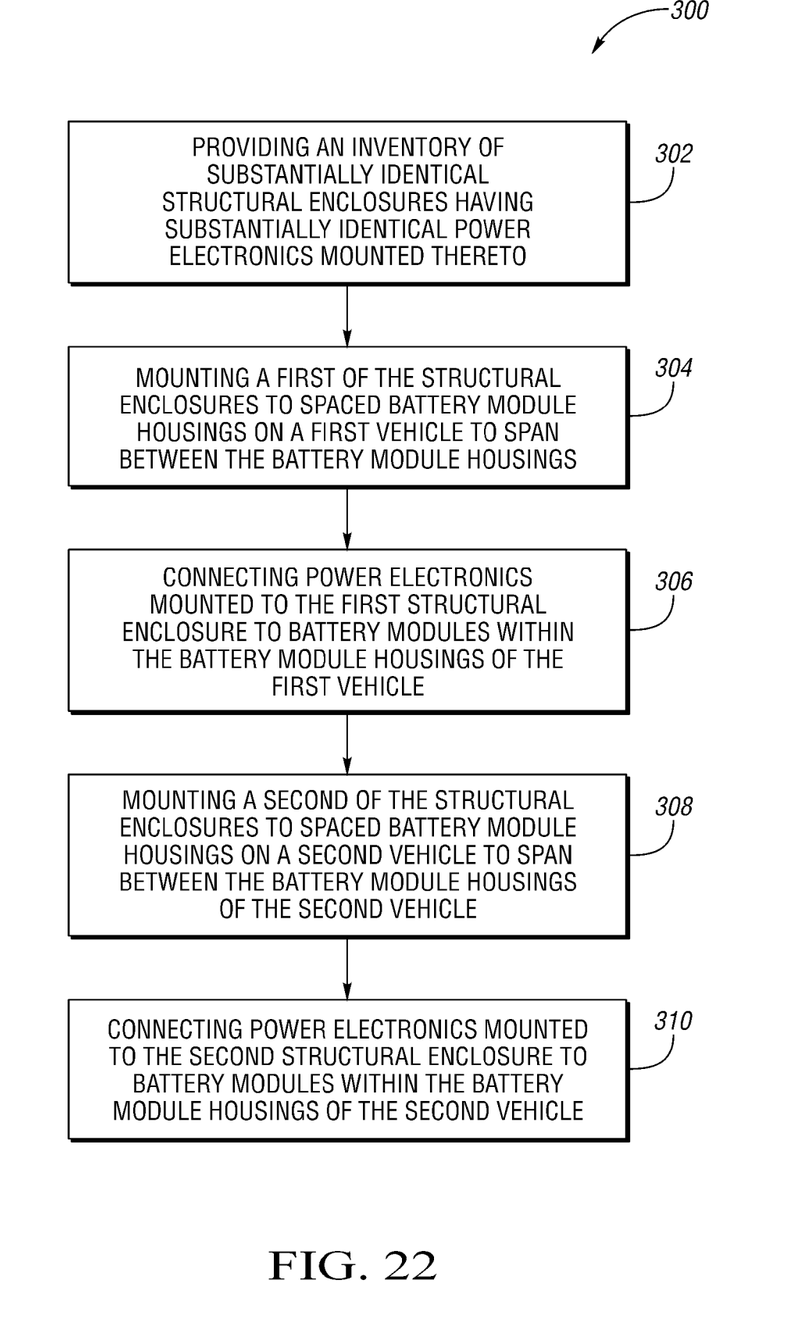
FIG. 22 is a flow diagram of a method of manufacturing vehicles.

Another advantage of the structural power supply module 10 is that it is designed as a fully integrated unit that can attach to and work with different lengths and widths of battery modules. This enables the same structural power supply module 10 (i.e., one inventory of the same structural power supply modules 10) to be used for multiple applications (e.g., on different vehicle platforms). This advantage is illustrated in the method 300 of manufacturing vehicles shown in the flow diagram of FIG. 22 and described with respect to FIGS. 18-20. The method 300 begins with block 302, providing an inventory of substantially identical structural enclosures 12. Block 302 is optional in that the inventory may be provided by another, such as by the manufacturer of the structural enclosures 12, rather than the manufacturer of the different vehicles 46, 46A, 46B. Next, in block 304, a first of the structural enclosures 12 is mounted to the laterally-spaced battery module housings 18, 22 on a first vehicle 46 to span between the battery module housings 18, 22. In block 306, power electronics, such as power electronics 52, mounted to the first structural enclosure 12 are then operatively connected to battery modules 14, 16 within the first battery module housings 18, 22, shown with power cable 98 connected to battery unit 17 through the structural enclosure 12 in FIG. 18.

Figure 19:
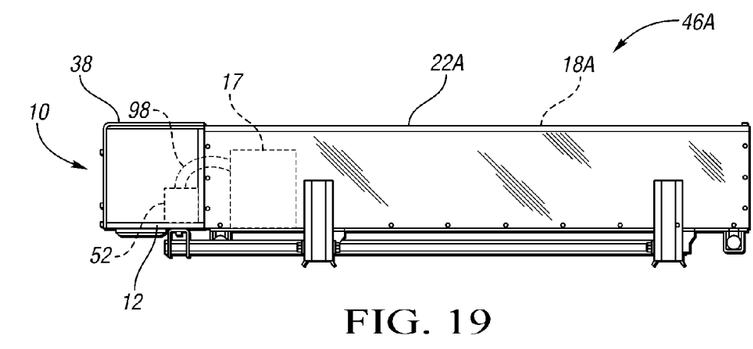
FIG. 19 is a schematic perspective illustration of the apparatus of FIG. 1 attached to different battery module housings of a second vehicle, with the battery module housings longer than those of FIG. 18.

In block 308, a second of the structural enclosures 12 is mounted to spaced battery housings 18A, 22A, only one of which is visible in the side view of FIG. 19, on a second vehicle 46A. Battery module housing 22A is spaced from battery module housing 18A similar to the spacing of battery module housings 18, 22, and is behind module housing 18A in the view of FIG. 19. Notably, the battery modules housings 18A, 22A are longer than the battery housings 18, 22 one shown 22A. However, the structural power supply module 10 and structural enclosure 12 are independent of the number of battery modules within the housings 18A, 22A, the length of the housings 18A, 22A, and the width of the housings 18A, 22A.

Figure 20:
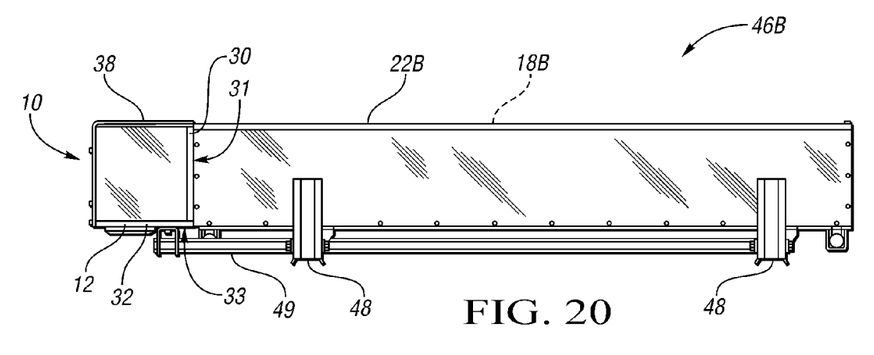
FIG. 20 is a schematic perspective illustration of the apparatus of FIG. 1 attached to still different battery module housings of a third vehicle, with the battery module housings of FIG. 20 being longer than those of FIGS. 18 and 19.

In block 310, power electronics, such as power electronics 52, mounted to the second structural power supply module 10A are then operatively connected to battery modules within the second battery module housings 18A, 22A, shown with power cable 98 connected to battery unit 17 through the structural enclosure 12 in FIG. 19. The power electronics within the structural enclosure 12 could be different from or identical to those within the structural enclosure 12 within the scope of the method 300. FIG. 20 illustrates a structural power supply module 10 connected with yet another vehicle 46B with different battery module housings 18B, 22B longer than the battery module housings 18, 22 and 18A, 22A of the first and second vehicles 46, 46A.

The structural enclosure 12 allows a convenient and efficient way to package and access the power supply and control system for spaced (e.g., saddle-bag) battery modules. The structural power supply module 10 is conveniently designed to be installed, removed, and serviced as a unit, and is designed so that it will interface with and be connectable to battery module support housings on multiple vehicle platforms.

While the best modes for carrying out the invention have been described in detail, those familiar with the art to which this invention relates will recognize various alternative designs and embodiments for practicing the invention within the scope of the appended claims.

What is claimed is:

1. An apparatus for a vehicle having a first battery module in a first battery module housing and a second battery module in a second battery module housing; wherein the battery module housings are spaced from one another to define a gap therebetween; wherein control of and power to the battery modules is through power electronics, the apparatus comprising: a structural enclosure configured to attach to both the first battery module housing and the second battery module housing while spanning the gap between the battery module housings when so attached; and wherein the structural enclosure is configured to support the power electronics and is configured to allow connection of the power electronics to the battery modules through the structural enclosure, wherein the power electronics include at least one electrical connector, at least one power shutoff, and internal power electronics; and further comprising: mechanical attachments supported by the structural enclosure at an internal surface of the structural enclosure; wherein the mechanical attachments are configured to attach to the internal power electronics such that the internal power electronics are enclosed within a cavity defined by the enclosure when attached to the mechanical attachments; wherein the structural enclosure has at least one external surface at which the structural enclosure supports said at least one power shutoff and said at least one electrical connector external of the cavity; and wherein the structural enclosure has openings positioned to permit said at least one power shutoff and said at least one electrical connector to operatively connect to said internal power electronics through said structural enclosure when said at least one power shutoff and said at least one electrical connector are supported at said at least one external surface.

2. The apparatus of claim 1, wherein the structural enclosure includes walls and a lid; wherein the lid is moveable from an open position to a closed position to enclose the cavity; wherein a first spaced opening and a second spaced opening are notches at a perimeter of at least one of the walls; and wherein the notches are covered when the lid is in the closed position.

3. The apparatus of claim 1, wherein the structural enclosure includes multiple sides partially defining a cavity configured to contain at least some of the power electronics; wherein at least one of the sides defines an opening; and wherein the enclosure further includes a lid operatively connected to said at least one of the sides at the opening and movable from an open position permitting access into the cavity and a closed position further defining the cavity and thereby enclosing said at least some of the power electronics within the cavity when at least some of the power electronics are supported by the enclosure.

4. The apparatus of claim 1, wherein the structural enclosure has fastener openings, and further comprising: multiple fasteners configured to extend through the fastener openings for attaching the structural enclosure to both the first battery module housing and the second battery module housing.

5. The apparatus of claim 1, wherein the vehicle has battery module support structure that supports the battery modules; and wherein the structural enclosure is configured to attach to the battery module support structure when the structural enclosure is attached to the battery module housings.

6. The apparatus of claim 1, wherein the vehicle has a longitudinally-extending component; and wherein the structural enclosure forms a notch so that the structural enclosure is packaged partially around the longitudinally-extending component at the notch when the structural enclosure is attached to the battery module housings.

7. The apparatus of claim 1, wherein the portion of the power electronics includes an electrical connector, wherein arrangement of the electrical connector in the gap and between the first battery housing and the second battery housing permits easy access for connector cables extending from the electrical connector to a motor/generator or a component of a vehicle transmission.

8. The apparatus of claim 3, further comprising: a sealing mechanism at an interface between the lid and said at least one of the sides to seal the cavity when the lid is in the closed position.

* * * * *